March 23, 1954    L. C. SNYDER    2,672,798
ADJUSTING MEANS FOR THE IRIS DIAPHRAGM
OF PHOTOGRAPHIC CAMERAS
Filed Dec. 26, 1951    3 Sheets-Sheet 1
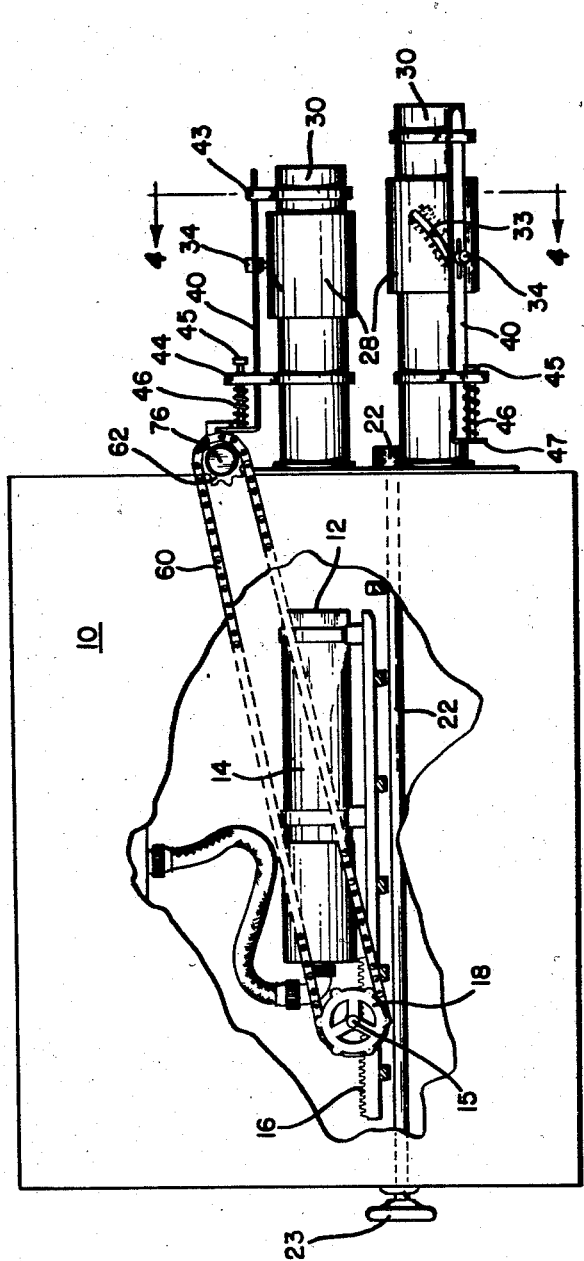
LEW  C.  SNYDER
INVENTOR
BY *Smith & Tuck*
ATTORNEYS March 23, 1954
L. C. SNYDER
2,672,798
ADJUSTING MEANS FOR THE IRIS DIAPHRAGM
OF PHOTOGRAPHIC CAMERAS
Filed Dec. 26, 1951
3 Sheets-Sheet 2
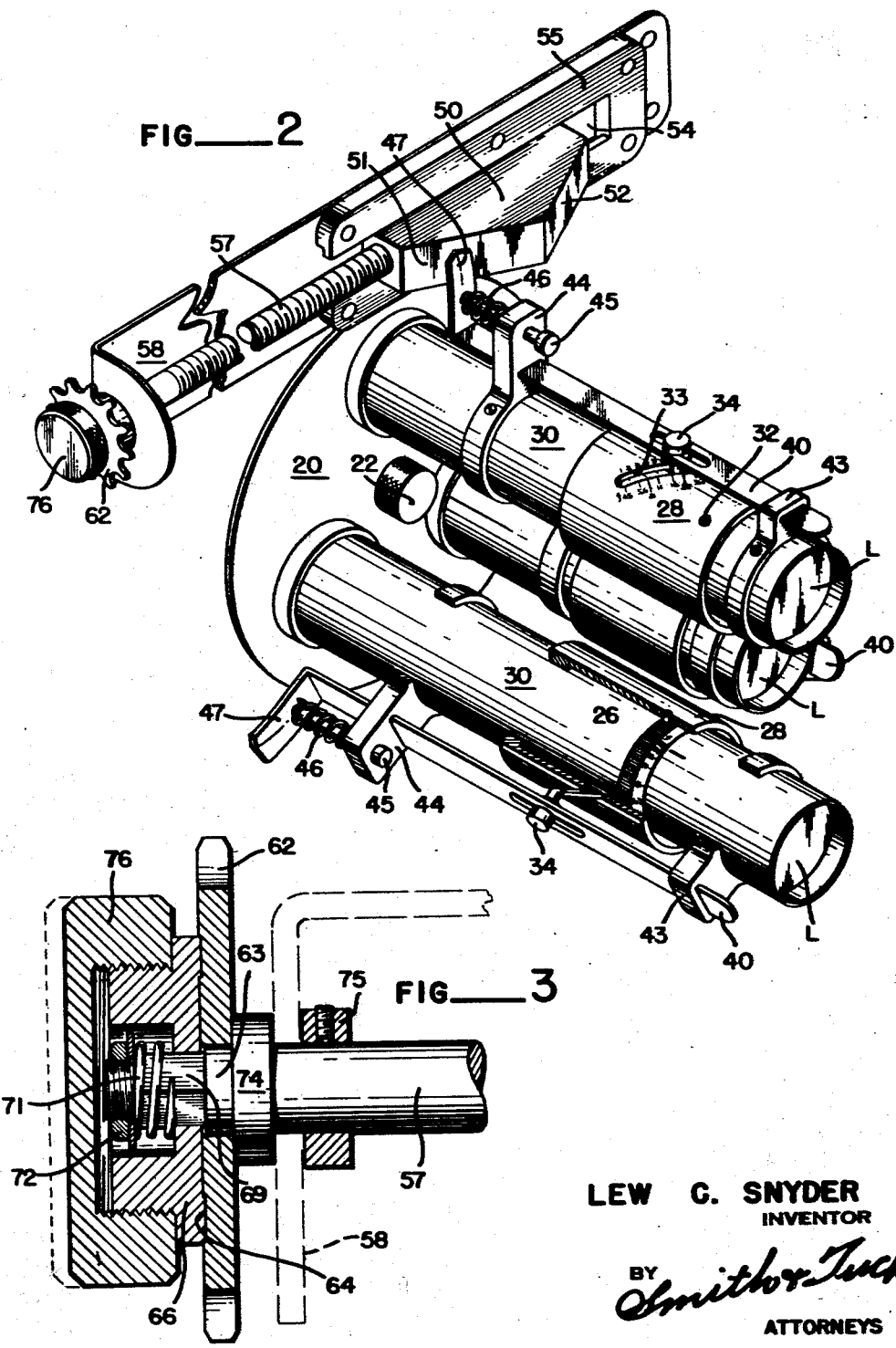
LEW C. SNYDER
INVENTOR
BY Smith & Tuck
ATTORNEYS March 23, 1954
L. C. SNYDER
2,672,798
ADJUSTING MEANS FOR THE IRIS DIAPHRAGM
OF PHOTOGRAPHIC CAMERAS
Filed Dec. 26, 1951
3 Sheets-Sheet 3
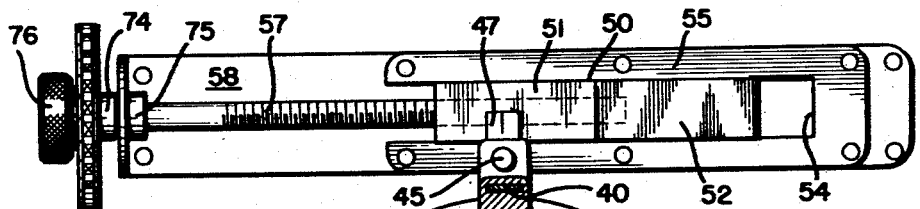
FIG. 4
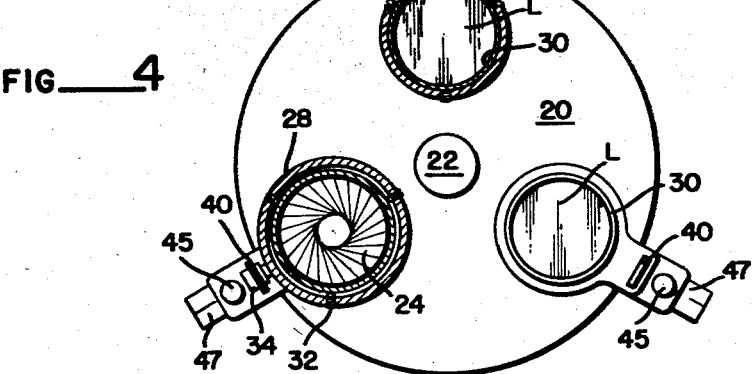
FIG. 7
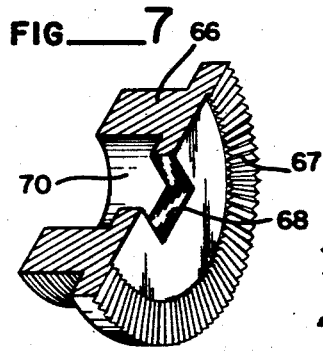
FIG. 5
FIG. 6
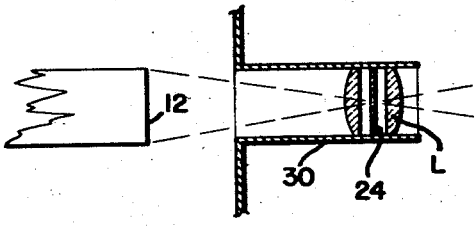
FIG. 8
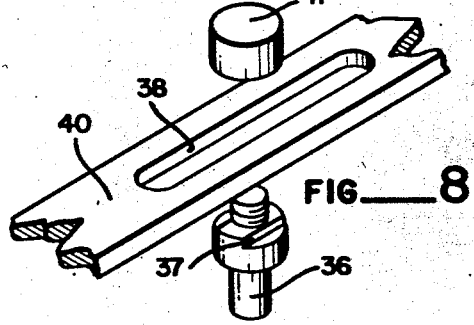
LEW C. SNYDER
INVENTOR
BY Smith & Tuck
ATTORNEYS Patented Mar. 23, 1954

2,672,798

UNITED STATES PATENT OFFICE 2,672,798

ADJUSTING MEANS FOR THE IRIS DIA-
PHRAGM OF PHOTOGRAPHIC CAMERAS

Lew C. Snyder, Seattle, Wash.

Application December 26, 1951, Serial No. 263,386

8 Claims. (Cl. 95—64)

My present invention consists of means for so coupling the iris diaphragm of a lens to the lens focusing means that the aperture of the lens will open or close to a degree which will provide a uniformity of light intensity being impressed on the sensitive surface within the camera. My adjusting means is so arranged that in the use of multiple lens turrets the change from one focal length to another will be fully compensated for and the uniformity of light intensity will at all times be maintained.

My invention is particularly adapted to television and motion picture cameras or to reproduction cameras or process cameras. In this field of photographic endeavor, the photographer has many distracting requirements placed upon him, especially in television and motion picture work where the distance from the camera to the subject quite often is varying constantly, or the requirements of the picture are such that images of different sizes are needed from the same relative positions. These conditions aggravate greatly the difficulties under which the photographer must work, and due to either the financial outlay in the set, or the fact that the subject may not be under control of the photographic agency, all accumulate to a condition where it is very desirable that all the human element can be removed from the picture taking procedure just as far as possible to the end that this final result will be of a high order of excellence. My present equipment is believed to solve many of these distressing problems.

It is a well known principle of optics, that for a given lens, the light intensity on a sensitive surface within the camera decreases as the distance between the sensitive surface and the lens increases and, conversely, as the distance between the sensitive surface and the lens decreases, the light intensity on the sensitive surface increases. To the amateur photographer dealing with film emulsions having a wide latitude of exposure, this condition does not present any great difficulty. For the photographer, however, dealing with specialized emulsions for specific purposes and most especially in color photography, the intensity of the light on the film is a very critical factor in obtaining adequate or proper exposure. For the operator of a television or motion picture camera, the light intensity is very critical inasmuch as the reproduction, whether on a television screen or on a motion picture screen, is a continuing sequence where the variations in light intensity are observed immediately. These conditions are aggravated particularly when the distance from the lens to the subject is relatively short. This condition requires constant focusing for clarity of the image and in the past it has been found very difficult for the photographer to make appropriate changes in his iris setting to insure uniform illumination due to the fact that he has so many items for which he must be correcting constantly, together with the requirement of always directing his camera at the center of the desired action.

The common practice today is as far as possible to limit the camera work in both television and motion picture to studio conditions where a definite level of lighting can be maintained throughout the picture taking stage. This overcomes one of the outstanding difficulties of exposure, that of varying light intensity on the subject. However, experience has proven that there is a real need for means that will insure uniformity of light admission to the camera as focal conditions change.

The principal object of my present invention therefore is to provide means for coupling the iris diaphragm control of a photographic lens to the focusing means used with that lens in a manner to insure a uniform intensity of light being projected by the lens upon the sensitive surface in the camera.

A further object of this invention is the provision of actuating means connected to the focusing equipment of a camera adapted to engage successively the various lenses of a turret as they are brought into registry for picture taking and adapted to provide uniform light intensity for any one of a group of lenses so used.

A further object of this invention is to provide means for controlling the light intensity of a plurality of lenses which can be pre-set for an aperture opening compatible with the light level of the photographic stage and which mechanism will thereafter vary the diaphragm opening of the lens to insure uniform light intensity to the sensitive surface throughout the full range of focusing adjustment.

Further objects, advantages and capabilities will be apparent from the description and disclosure in the drawings, or may be comprehended or are inherent in the device.

In the drawings:

Figure 1 is a side elevation of a television camera employing my novel iris diaphragm control means with certain parts of the camera broken away to illustrate more fully the association of the various parts;

Figure 2 is a perspective view illustrating a typical lens turret and certain of the associated mechanism for controlling the iris diaphragm opening therein;

Figure 3 is an axial sectional view of the control knob shown in Figure 2, the supporting frame being shown in dashed lines and the adjusting position of the knob being shown in dotted lines;

Figure 4 is a cross-sectional view taken along the plane of line 4—4 of Figure 1;

Figure 5 is a diagrammatic view showing the passage of light from the lens to a sensitive surface relatively close to the lens;

Figure 6 is a view similar to Figure 5 which shows the sensitive surface somewhat removed from the lens;

Figure 7 is a perspective view, partly in section, showing a portion of the control knob assembly of Figure 3;

Figure 8 is an exploded perspective view in fragmentary form showing a portion of the iris operating mechanism.

Referring more particularly to the disclosure in the drawings, the numeral 10 designates a camera which in this particular showing indicates a television camera. It is, however, desired to point out that my particular control means, while especially adapted to television camera work, can be used with any form of camera, although normally questions of bulk and purpose, and initial cost, for the present appear to limit this invention to what might be termed professional cameras for various serious work. Referring to Figure 1, disposed within the body of camera 10 is a light sensitive surface 12. In this particular showing this is a screen of an electronic scanning device 14 as employed in television work. The sensitive surface 12 however might be the plate or film of a process camera, a motion picture camera, or even a camera for amateur use. The one essential to picture taking must be met however in that the sensitive surface must be capable of being adjustably positioned with respect to the focal distance required by the particular lens with which it is used when photographing an object at a given distance. In Figure 1 a focusing arrangement, as quite commonly employed, is shown wherein tube 14 is mounted for reciprocation on suitable trackage and adequate focusing means is provided to change the position of the sensitive surface 12 with respect to the picture taking lens. In this instance a rack gear has been indicated at 16. A spur pinion is adapted to engage rack 16 and is secured to control shaft 15 which in turn is capable of rotation by means of the external band wheel 18. This arrangement provides that while the axis of the control wheel shaft remains fixed, rack gear 16 and the associated part as tube 14 and screen 12 may be moved longitudinally for focusing purposes.

Cameras for serious work and especially professional cameras are usually provided with a plurality of lenses which in turn are mounted in a turret arrangement so that any one of the various lenses, differing usually only in focal length, can be brought into registry with the optical axis of the camera. One such arrangement is illustrated in Figures 2 and 4. Here the revolvable plate 20 is disposed for revolution about a central shaft 22 and this shaft for convenience is controlled by a hand wheel 23 disposed at the rear of the camera. The operator then can by turning hand wheel 23 bring any one of the several lenses of the turret into proper axial alignment for use. Incorporated in plate 20 in a manner very commonly employed in this field is adequate means for light sealing the opening of the camera box 10 so that when a lens is in alignment with the axis of the camera no extraneous light will be admitted.

Lenses for turret mounting, of which there may be any reasonable number, are normally provided with what is referred to as a barrel mount, in other words a tubular arrangement which positions the lens so that the full range of its covering capacity can be utilized by the focusing arrangement within the camera. It follows that the longer the focal length of the lens the longer will be the barrel tubing in order to obtain this optimum position. Characteristic of lenses when mounted is the need for a means to control the effective aperture of the lens to be used, or to control the amount of light that the lens can pass to the sensitive surface.

The most commonly employed means is the iris diaphragm indicated at 24 in Figure 4. This is normally formed of a plurality of leaves each of which present light-blocking edges which are tangent to a circle. By having a large number of leaves, the effect of a circle, which is really a polygon, is achieved. A control is employed to move these leaves to form a small or large apparent circle and this control must of necessity reach to the outside of the camera; in the present showing this is indicated by the knurled band 26 which normally is provided with suitable graduations in F values for the lens use.

To make use of my control means I employ a sleeve as 28 which encircles the lens barrel 30. This sleeve fixedly engages the iris diaphragm operating band 26, being secured to it by a plurality of set screws 32. When so used sleeve 28 is in effect merely an enlarged band coupled to the iris diaphragm control means. Within the sleeve 28 is provided a cam slot 33. This slot must be properly proportioned so that it will act truly as a cam and cause the rotation of sleeve 28 when engaged by the operating pin or detent 34. Slot 33 is most conveniently graduated in F values for the lens and possibly in other focal relationship graduations or even in arbitrary numbers, so that the operator can at all times determine the setting for his lens and check it when it is being operated by the control means.

Detent assembly 34 consists of an operating detent portion 36 formed with a parallel-sided portion 37 adapted to slidably engage slot 38 in the operating bar 40. A threaded cap or nut 41 secures the detent in fixed adjusted position with bar 40. This adjustment is normally made to correspond to the F setting that the diaphragm must be given to conform to the light density required on the sensitive surface. This setting will therefore vary with the light level of the scene being photographed. Usually a photoelectric exposure meter will give this value, although normally in a fixed studio the value is standardized by means of controlling the light intensity at its source.

The operating bar 40 is slidably positioned with respect to lens barrel 30 by a forward guide member 43 and a rear guide member 44. This rear guide member also has an upstanding boss which positions a slidable spring-urged plunger 45 which acts in a rearward direction under the urgence of spring 46. Plunger 45 rests upon an upturned portion of bar 40 which is preferably V shaped to provide a cam follower 47. Where more than one lens is used on a camera it is necessary that each lens has a similar diaphragm control means.

Cam follower 47 is adapted to operably engage the focus-correction cam 50. One practical form of such a cam is shown in Figures 2 and 4. It consists of the cam 50 having the two similar faces as 51 and 52 which are normally of the same conformation but oppositely faced as it is desirable many times, to revolve the turret either clockwise or counterclockwise. Cam 50 is mounted for reciprocation, as within the dovetailed slot 54, of the guideway 55. One convenient means for operating cam 50 is by means of a threaded rod 57 which is held by bracket 58 and suitable juxtaposed collars so that there is no end movement possible in shaft 57 and therefore as it is threaded into the block of cam 50 it will cause longitudinal movement in either direction in accordance with the direction of rotation of rod 57.

For carrying out the principles of my invention which entail the coupling of the diaphragm control device to the focusing device of the camera, I have provided a connecting block chain 60 which preferably engages a sprocket mounted on hand wheel 18, and a second sprocket 62, revolvably positioned on rod or shaft 57. Sprocket 62 is adjustably affixed to shaft 57 by the control knob shown in Figure 3. Sprocket 62 is actually positioned upon shaft 57 by bearing upon the cylindrical portion 63. It is provided, however, with a row of concentric teeth at 64 and these teeth mesh with complementary teeth formed upon the coupling member 66. The form of these teeth is probably best shown in Figure 7 wherein teeth 67 are illustrated and they in turn are similar in all respect to the teeth 64 on sprocket 62. Coupling 66 is provided with a deformed opening at 68 so as to operably engage a similarly deformed portion 69 of shaft 57. In the drawings a square deformation has been illustrated. Coupling 66 is further provided with an axially disposed recess in which is housed the compression spring 71 with the locking nut 72. Normally coupling 66 and sprocket 62 are urged in tight engagement with the fixed collar 74 formed as part of shaft 57. A set collar is provided at 75 on the opposite side of bracket 58 so as to fixedly position shaft 57 against longitudinal movement. A knurled cap is secured to coupling 66 as is illustrated at 76. The operator, desiring to make an adjustment in the positioning of cam 50, to make it conform to the position of the sensitive surface 12, may pull the knob assemby to the left as viewed in Figure 3, to the dotted line position shown. This will disengage teeth 67 from teeth 64 and shaft 57 can be revolved to give the new position desired for cam 50. During this period chain 60 has held sprocket 62 in its fixed position and without disturbing hand wheel 50 or the positioning of screen 12.

*Method of operation*

In considering the operation of my device, it can be used in conjunction with a single lens on any form of camera. The camera becomes more complicated however and serves a more practical purpose when my equipment is used with a series of lenses such as is normally used in a turret mount and the following description is based upon a turret mount.

When a photographer has a scene to record on a sensitive surface, he usually first makes a determination of the light intensity of the subject, and based upon his experience, will require a definite aperture setting of his lenses so that an acceptable amount of light will be impressed upon the sensitive surface during the exposure period. Using my equipment, the operator disengages the coupling 66 and the sprocket 62 by retracting cap 76 against spring 71 until the teeth on the two members are disengaged. Holding the cap 76 in substantially the dotted line position of Figure 3, cam 50 can be adjusted to the desired position so that by means of the followers 47 and bar 40 sleeves 28 will be turned so that the diaphragm 24 will be set properly in accordance with light level previously determined, these values being read on the graduations of slot 33. All three lenses can be synchronized by the adjustment detent member 34 within slot 38 of bar 40 after the synchronization has been achieved then cam 50 will act similarly on all lenses.

When all adjustments of the various lenses L and cam 50 have been completed, cap 76 is released and teeth 67 and 64 permitted to re-engage under urgence of spring 71. This now couples sprocket 62 to shaft 57 and places it under control of hand wheel 18 by virtue of the connecting chain 60. The operator to take a picture now selects the appropriate lens L by means of hand wheel 23, thus turning the desired lens into its operating position and then as he operates hand wheel 18 to effect appropriate focusing of sensitive surface 12 he will automatically vary the position of cam 50 and this in turn through bar 40 will increase or decrease the diaphragm setting so that the actual light available on the sensitive surface will remain constant.

A study of Figures 5 and 6 will indicate why there is a variation in light intensity. As viewed in Figure 5, it may be assumed that the cone of light passing out through lens L is just sufficient to cover fully sensitive surface 12. Then as the same elements are viewed in Figure 6, in which the sensitive surface 12 is considerably removed from the position of Figure 5, it will be noted that the angle of the cone of light which will impinge on surface 12 is much narrower than that of Figure 5. In other words, a good deal of the light that is passed by lens L is lost beyond the margins of surface 12 in the showing of Figure 6 and this naturally causes a substantial reduction in the light intensity which now falls on surface 12. It follows that the angle of the cone of light passed by a single lens L will be uniform. Therefore, considering only Figure 6, the initial adjustment of my diaphragm means must be such that with the adjustment of Figure 6, adequate light is introduced to surface 12. When surface 12 is brought closer to the lens as in Figure 5, then the iris diaphragm 24 must be stopped down considerably, or the effective light passage opening must be very substantially reduced, in order to maintain the same light intensity on the surface 12 in the arrangement of Figure 5. My equipment will achieve this result and a careful study of the various views and the foregoing description should portray it clearly.

It follows further that when proper adjustments have been made as by the positioning of detent members 34, the same balance of light will be obtained no matter which of the various lenses of the turret are brought into registry with the camera axis. Further this will be taken care of automatically without further attention from the photographer and thus the intensity of light from any position of the three or more lenses will be constant in intensity and the principal object of this present invention will be fully served.

It is believed that it will be clearly apparent from the above description and the disclosure in the drawings that the invention comprehends a novel construction of adjusting means for the iris diaphragm of photographic cameras.

Having thus disclosed the invention, I claim:

1. In a camera of the type having a housing and lens means disposed thereon and having a light sensitive, image receiving member disposed in said housing and having manually adjustable means moving said image receiving member in relation to said lens means to various focal distances, adjusting means for light intensity, comprising: said lens means having a turret which is rotatable in relation to said housing and having a plurality of lens units thereon; each lens unit having a lens barrel and having a lens and an iris diaphragm positioned in said lens barrel, said diaphragm having an adjusting ring thereon, a sleeve rotatably mounted on said barrel and secured to said adjusting ring, said sleeve having a helical slot therein, a bar positioned alongside said barrel and slidable longitudinally thereof, a detent secured to said bar and positioned in said helical slot whereby said adjusting ring is rotated and said iris diaphragm is adjusted as said bar is moved longitudinally of said barrel; a cam member positioned on said housing and disposed to move transversely of the barrel of whichever selected lens unit is positioned by said turret in operative relationship to said image receiving member, said cam member having a cam surface which is disposed diagonally of the bar of said selected lens unit; means connecting said cam member to said manually adjustable means so that said cam member is moved as the focal distance is changed; and a cam follower on each of said bars to bear on said cam surface, said cam followers being disposed so that the bar of said selected unit is moved longitudinally of its barrel as said cam member moves transversely thereof and so that when a different lens unit is selected by rotation of said turret its cam follower contacts said cam surface and its bar is moved thereby adjusting its iris diaphragm.

2. In a camera of the type having a housing and lens means disposed thereon and having a light sensitive, image receiving member disposed in said housing and having manually adjustable means moving said image receiving member in relation to said lens means to various focal distances, adjusting means for light intensity, comprising: a lens barrel and an iris diaphragm, said lens means and said iris diaphragm being positioned in said lens barrel; said diaphragm having an adjusting ring thereon; a sleeve rotatably mounted on said barrel and secured to said adjusting ring, said sleeve having a helical slot therein; a bar positioned alongside said barrel and slidable longitudinally thereof; a detent secured to said bar and positioned in said helical slot whereby said adjusting ring is rotated and said iris diaphragm is adjusted as said bar is moved longitudinally of said barrel; a cam member disposed to move transversely of said barrel having a cam surface which is disposed diagonally of said bar; means connecting said cam member to said manually adjustable means so that said cam member moves transversely of said barrel as the focal distance is changed; and a cam follower on said bar bearing on said cam surface so that said bar is moved longitudinally of said barrel as said cam member moves transversely of said barrel.

3. In a camera of the type having a housing and lens means disposed thereon and having a light sensitive, image receiving member disposed in said housing and having manually adjustable means moving said image receiving member in relation to said lens means to various focal distances, means for changing light intensity, comprising: said lens means having a turret which is rotatable in relation to said housing and having a plurality of lens units thereon, each lens unit having a lens barrel and having a lens and an iris diaphragm positioned in said lens barrel and having a diaphragm adjusting member for adjusting said diaphragm, adjusting means on said barrel connected to said diaphragm adjusting member for changing the adjustment of said iris diaphragm, said adjusting means having a cam follower; a mechanical linkage connected to said manually adjustable means, said mechanical linkage having a cam member, said cam member having a cam surface bearing on the cam follower of whichever selected lens unit is positioned by said turret in operative relationship to said image receiving member, said mechanical linkage and said cam surface and the cam follower of said selected lens unit changing the adjustment of the diaphragm of said selected lens unit as said manually adjustable means is operated to change the focal distances, said mechanical linkage moving said diaphragm adjusting member of said selected lens unit to spread its iris diaphragm to increase light intensity as said focal distance is increased and moving said diaphragm adjusting member of said selected lens unit to contact its iris diaphragm to decrease light intensity as said focal distance is decreased; said cam surface, when a different lens unit is selected by rotation of said turret, contacting the cam follower of said different lens unit adjusting its diaphragm to focal distance as said different lens unit moves into operative position.

4. In a camera of the type having a housing and lens means disposed thereon and having a light sensitive, image receiving member disposed in said housing and having manually adjustable means moving said image receiving member in relation to said lens means to various focal distances, adjusting means for light intensity, comprising: said lens means having a turret which is rotatable in relation to said housing and having a plurality of lens units thereon; each lens unit having a lens barrel and having a lens and an iris diaphragm positioned in said lens barrel and having a diaphragm adjusting member for adjusting said diaphragm; a mechanical linkage between said manually adjustable means and the diaphragm adjusting member of whichever selected lens unit is positioned by said turret in operative relationship to said image receiving member, said mechanical linkage changing the adjustment of the diaphragm of said selected lens unit as said manually adjustable means is operated to change the focal distances, said mechanical linkage moving said diaphragm adjusting member of said selected lens unit to spread its iris diaphragm to increase light intensity as said focal distance is increased and moving said diaphragm adjusting member of said selected lens unit to contract its iris diaphragm to decrease light intensity as said focal distance is decreased; said mechanical linkage, when a different lens unit is selected by rotation of said turret, contacting its diaphragm adjusting member adjusting its diaphragm to focal distance as said different lens unit moves into operative position.

5. In a camera of the type having a housing and lens means disposed thereon and having a light sensitive, image receiving member disposed in said housing and having manually operable means moving said image receiving member in relation to said lens means to various focal distances, adjusting means for light intensity, comprising: a lens barrel and an iris diaphragm, said lens means and said iris diaphragm being positioned in said lens barrel; a sleeve rotatably mounted on said barrel and connected to said diaphragm for adjustment thereof, said sleeve having a helical slot therein; a bar positioned alongside said barrel and slidable longitudinally thereof; a detent secured to said bar and positioned in said helical slot whereby said sleeve is rotated and said iris diaphragm is adjusted as said bar is moved longitudinally of said barrel; a threaded shaft extending transversely of said barrel and a cam member having a threaded opening therethrough in which said shaft is positioned whereby said cam member is responsive to rotation of said shaft; said manually operable means including a sprocket disposed to rotate as the position of said image receiving member is adjusted and a sprocket secured to said shaft and a flexible endless connector connecting said sprockets so that said shaft is rotated upon operation of said manually operable means in adjusting the focal distance of said image receiving member; a cam follower on said bar and a cam surface on said cam member extending diagonally of said bar and contacting said cam follower to move said bar toward closing the iris diaphragm to decrease light intensity as said focal distance is decreased and to move said bar toward opening the iris diaphragm to increase light intensity as said focal distance is increased.

6. In a camera of the type having a housing and lens means disposed thereon and having a light sensitive, image receiving member disposed in said housing and having manually adjustable means moving said image receiving member in relation to said lens means to various focal distances, means for changing light intensity, comprising: said lens means having a turret which is rotatable in relation to said housing and having a plurality of lens units thereon, each lens unit having a lens barrel and having a lens and an iris diaphragm positioned in said lens barrel, a sleeve rotatably mounted on said barrel and secured to said diaphragm, said sleeve having a helical slot therein, a bar positioned alongside said barrel and slidable longitudinally thereof, a detent secured to said bar and positioned in said helical slot whereby said iris diaphragm is adjusted as said bar is moved longitudinally of said barrel; a threaded shaft extending transversely of the barrel of which ever selected lens unit is positioned by said turret in operative relationship to said image receiving member and a cam member having a threaded opening therethrough in which said shaft is positioned whereby said cam member is responsive to rotation of said shaft; mechanical means connecting said shaft and said manually adjustable means to rotate said shaft as said manually adjustable means is operated so that said cam member is moved as focal distance is changed; said cam member having a cam surface which is disposed diagonally of the bar of said selected lens unit and a cam follower on each of said bars to bear on said cam surface, said cam followers being disposed so that the bar of said selected unit is moved longitudinally of its barrel as said cam member moves transversely thereof and so that when a different lens unit is selected by rotation of said turret its cam follower contacts said cam surface and its bar is moved thereby adjusting its iris diaphragm.

7. In a camera of the type having a housing and lens means disposed thereon and having a light sensitive, image receiving member disposed in said housing and having manually operable means moving said image receiving member in relation to said lens means to various focal distances, adjusting means for light intensity, comprising: a lens barrel and an iris diaphragm, said lens means and said iris diaphragm being positioned in said lens barrel; a bar positioned alongside said barrel and slidable longitudinally thereof and means connecting said bar to said iris diaphragm to adjust said iris diaphragm as said bar is moved along said barrel; a threaded shaft extending transversely of said barrel and a cam member having thread means coacting with the threads of said shaft whereby said cam member is moved transversely of said barrel as said shaft is rotated; said manually operable means including a sprocket disposed to rotate as the position of said image receiving member is adjusted and a sprocket disposed on said shaft and a flexible endless connector connecting said sprockets so that said sprocket on said shaft is rotated upon operation of said manually operable means in adjusting the focal distance of said image receiving member; an adjusting member on said shaft disposed to rotate therewith and interengaging abutting surfaces on said adjusting member and said sprocket on said shaft, said adjusting member being slidable on said shaft out of engagement with said sprocket on said shaft and spring means normally positioning said adjusting member with said interengaging surfaces abutting and a control knob on said adjusting member manually operable to move said adjusting member to disengage said interengaging surfaces permitting adjustment of the position of said cam member; a cam follower on said bar and spring means normally pressing said cam follower into engagement with said cam member, a cam surface on said cam member extending diagonally of said bar and contacting said cam follower to move said bar toward closing the iris diaphragm to decrease light intensity as said focal distance is decreased and to move said bar toward opening the iris diaphragm to increase light intensity as said focal distance is increased.

8. In a camera of the type having a housing and lens means disposed thereon and having a light sensitive, image receiving member disposed in said housing and having manually adjustable means moving said image receiving member in relation to said lens means to various focal distances, means for changing light intensity, comprising: said lens means having a turret which is rotatable in relation to said housing and having a plurality of lens units thereon, each lens unit having a lens barrel and having a lens and an iris diaphragm positioned in said lens barrel, a cam follower member movable in relation to said barrel and means connecting said cam follower member to said iris diaphragm to adjust said diaphragm as said cam follower member moves in relation to said barrel; a threaded shaft extending transversely of the barrel of which ever selected lens unit is positioned by said turret in operative relationship to said image receiving member and a cam member having threaded means coacting with the threads of said shaft whereby said cam member is moved transversely of the barrel of the selected lens unit upon rotation of said shaft; mechanical means connecting said shaft and said manually adjustable means to rotate said shaft as said manually adjustable means is operated so that said cam member is moved as focal distance is changed and said mechanical means including a manually operable clutch between said shaft and said manually adjustable means permitting adjustment of the position of said cam member independently of said manually adjustable means by manual disengagement of said clutch; said cam member having a cam surface and said cam follower members being disposed so that the cam follower member of said selected unit is moved by said cam surface as said cam member moves transversely of its barrel and so that when a different lens unit is selected by rotation of said turret its cam follower contacts said cam surface thereby adjusting its iris diaphragm.

LEW C. SNYDER.

References Cited in the file of this patent

UNITED STATES PATENTS

| Number | Name | Date |
| --- | --- | --- |
| 1,520,185 | Johnson | Dec. 23, 1924 |
| 1,777,257 | Debrie | Sept. 30, 1930 |
| 2,046,926 | Richardson | July 7, 1936 |
| 2,549,230 | Parody | Apr. 17, 1951 |
| 2,553,656 | Kirby | May 22, 1951 |
| 2,572,729 | Jackson et al. | Oct. 23, 1951 |

FOREIGN PATENTS

| Number | Country | Date |
| --- | --- | --- |
| 908,653 | France | Oct. 11, 1945 |